Figure 1:
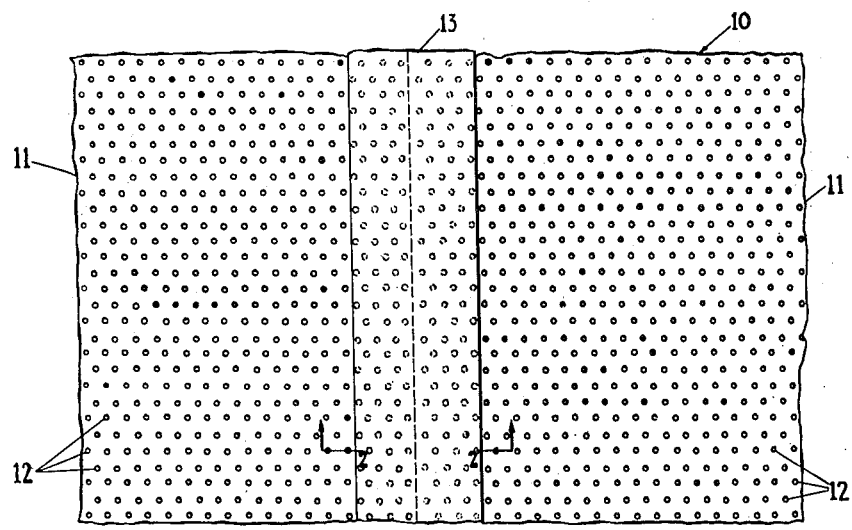

May 3, 1932.  C. A. ALT ET AL  1,856,739
PROJECTION SCREEN
Filed Dec. 6, 1929

Cornelius A. Alt
Robert A McLean  Inventors

By their attorney
Albert T. St Clair

Patented May 3, 1932

1,856,739

UNITED STATES PATENT OFFICE

CORNELIUS A. ALT AND ROBERT A. McLEAN, OF NEWBURGH, NEW YORK, ASSIGNORS TO E. I. DU PONT DE NEMOURS & COMPANY, OF WILMINGTON, DELAWARE, A CORPORATION OF DELAWARE

PROJECTION SCREEN

Application filed December 6, 1929. Serial No. 412,019.

This invention relates to the art of projection screens, and more particularly to the art of making such screens by joining two or more sections of suitable material in order to produce the size of screen desired.

In the motion picture screen art it is customary to make the finished projection screen by uniting a plurality of individual sections of the material out of which the screen is made. One of the customary methods of making these screens is to sew together the edges of specially coated material, such as imitation leather. While this type of material is admirably adapted for such purposes, it is not practicable to manufacture it in a sufficient width to permit its use for such purposes without resorting to the uniting of several sections, and the prior method of uniting these sections, by sewing the adjacent edges, has not produced satisfactory results. For example, the joint is unsightly when the screen is not in use and it has a tendency to produce streaks when the picture is projected thereon.

Among the desirable characteristics of such screens are that they be made of relatively flexible material and yet be rigid enough so that they can be held in a frame, the material must be substantially white or silvery in color, it must be free from streaks which would be magnified by the strong light from the projection lamp, the surface should be substantially flat, and it must not discolor with age. Furthermore, with screens which are intended for the production of sound pictures, it is highly desirable, if not absolutely necessary, that they be provided with a large number of small perforations, inasmuch as the sound producing instrument is preferably placed just in back of the screen so that the sound can be passed thru the perforations in the screen rather than thru a separate member.

We have found that all these characteristics of a projecting screen can be obtained without the disadvantages inherent in the prior method of making such screens by butting the adjacent edges of the sections it is desired to unite, softening them with a suitable solvent, and applying a strip of softened pyroxylin film or equivalent material over said butted edges.

It is therefore an object of this invention to provide a new method of joining sections of pyroxylin coated cloth or paper, or equivalent material.

It is a further object of this invention to produce moving picture screens out of a plurality of sections of pyroxylin coated material with an improved joint therebetween.

It is a still further object of this invention to produce a suitable screen for the projection of sound pictures.

Figure 2:

With the above and other objects in view, which will be apparent as the description proceeds, we have set forth our invention in the following specification and have illustrated it in the accompanying drawings, in which:

Figure 1 is an elevational view of a portion of our improved screen for the projection of sound pictures; and Figure 2 is a horizontal transverse sectional view on the line 2—2 of Figure 1.

Referring to the accompanying drawings, 10 designates a motion picture projection screen formed of a plurality of sections 11 of fabric provided with a pyroxylin coating on both sides, and with a large number of small perforations 12 in each section. At their adjacent edges the sections are united by a strip of transparent pyroxylin film 13.

In practice the sections of perforated pyroxylin coated fabric are prepared in any suitable manner, for example, by applying any desired number of coatings of pyroxylin jelly to each side of the fabric, by means of a coating machine in a manner well known in the art, and then perforating the fabric with any suitable punching equipment. The finished fabric, provided with parallel sides, is then cut in strips, each of which is the height of the desired screen.

Two of these strips are placed on any suitable table with the edges butted, and the material is wetted with a suitable solvent, such as a mixture of equal parts by weight of ethyl acetate and ethyl alcohol, the surface wetted being a few inches, for example, a little over two inches, on each side of the proposed joint. A ribbon of softened pyroxylin film is wetted with a similar or any other suitable solvent, and applied over the wetted area of the coated fabric, while both substances are in a softened condition, the ribbon covering the very small space between the two pieces of coated fabric and extending for about two inches on each side. The materials are allowed to dry, and the joint is complete.

Although the above example is limited to the use of fabric provided with a coating of pyroxylin jelly on both sides, we desire to have it understood that equivalent materials may be used for the coating, that the latter may be applied to only one side if desired, and that the fabric may be of any suitable material, such as cotton sheeting, cotton sateen material, or paper.

These strips of coated material are of any practicable width, although a fifty inch (50") width is practicable for most purposes.

Furthermore, the coating material may be provided with any suitable pigments, such as perfectly white pigments, or those having any desired tints of white, or they may be such as to impart a metallic effect, like aluminum or gold bronze.

The strip of pyroxylin film used to form the joint is preferably provided with a suitable softener, such as tricresylphosphate, or castor oil, to overcome the tendency toward buckling and rapid embrittlement which is characteristic of non-softened pyroxylin films.

Furthermore, it will be obvious that any desired means may be utilized to weight down the pyroxylin film after it is applied to the butted sections of coated material and while it is drying.

Any equivalent transparent plastics or sheet materials, such as cellulose acetate films, casein plastics, or phenol condensation products can be used in place of the pyroxylin film where desired.

The sheet of pyroxylin film or equivalent material used should not be of sufficient thickness to cause buckling and, while this will vary with the particular film material used and the thickness and other characteristics of the coated material to which it is applied, the thickness used is preferably the minimum that will withstand the forces tending to pull the joint apart to which the material is likely to be subjected in use. Furthermore, while this material is referred to above as being transparent, which is of course necessary when it is used with perforated screens, in order to prevent the production of a streak which would cause a shadow in the image on the screen, it will be obvious that where it is used in connection with unperforated screens it need not be transparent.

It will therefore be apparent that we have developed a new and useful motion picture projection screen, especially one adapted for the production of sound pictures, and a new and simple method of making such screens, and that the resulting product may be made in any desired size, of any suitable color, and of a number of different materials, and will possess all the necessary and desirable characteristics of such screens, including flexibility, sound transmission, transparency, attractiveness, strength, and absence of streaks.

It is apparent that many changes may be made in the specific embodiments of our invention without departing from the spirit thereof and we do not wish to be understood as limiting ourselves to the specific details thereof except as defined by the appended claims.

We claim:

1. A method of making motion picture projection screens, which comprises placing strips of coated fabric, suitable for the projection of images thereon, side by side with their adjacent edges butted, softening the coating adjacent the edge portions of these strips, and applying a softened strip of flexible transparent plastic sheet material thereto.

2. The method of claim 1, in which the strips of coated fabric are perforated.

3. The method of claim 1, in which the strips of coated fabric are perforated and in which the transparent material comprises pyroxylin.

4. The method of claim 1, in which the strip of coated fabric is a perforated pyroxylin coated fabric.

5. A motion picture projection screen, comprising a plurality of sections of coated fabric, suitable for the projection of images thereon, with their adjacent edges butted and held together by flexible transparent plastic sheet material.

6. The screen of example 5, in which the coated fabric is perforated.

7. The screen of example 5, in which the coated fabric is perforated, and in which the transparent material comprises pyroxylin.

8. The screen of example 5, in which the coated fabric is a perforated pyroxylin coated fabric.

In testimony whereof we affix our signatures.

CORNELIUS A. ALT.
ROBERT A. McLEAN.